US012499899B2

United States Patent
(12) United States Patent
Tyagi et al.

(10) Patent No.: US 12,499,899 B2
(45) Date of Patent: Dec. 16, 2025

(54) LOW-LATENCY, LOW-FREQUENCY EFFECTS CODEC

(71) Applicant: DOLBY LABORATORIES LICENSING CORPORATION, San Francisco, CA (US)

(72) Inventors: Rishabh Tyagi, Sydney (AU); David McGrath, Rose Bay (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 305 days.

(21) Appl. No.: 17/635,795

(22) PCT Filed: Sep. 1, 2020

(86) PCT No.: PCT/US2020/048954

§ 371 (c)(1),
(2) Date: Feb. 16, 2022

(87) PCT Pub. No.: WO2021/046060

PCT Pub. Date: Mar. 11, 2021

(65) Prior Publication Data

US 2022/0293112 A1 Sep. 15, 2022

Related U.S. Application Data

(60) Provisional application No. 62/895,049, filed on Sep. 3, 2019, provisional application No. 63/069,420, filed on Aug. 24, 2020.

(51) Int. Cl.
*G10L 19/02* (2013.01)
*G10L 19/008* (2013.01)
(Continued)

(52) U.S. Cl.
CPC ........ *G10L 19/0204* (2013.01); *G10L 19/008* (2013.01); *G10L 19/032* (2013.01);
(Continued)

(58) Field of Classification Search
CPC . G10L 19/0204; G10L 19/008; G10L 19/032; G10L 19/167; G10L 25/18; G10L 25/21; G10L 19/012; G10L 19/0212
See application file for complete search history.

(56) References Cited

U.S. PATENT DOCUMENTS

| | | | | |
|---|---|---|---|---|
| 5,684,920 A * | 11/1997 | Iwakami | ............ G10L 19/0212 | |
| | | | 704/262 | |
| 5,974,380 A | 10/1999 | Smyth | | |

(Continued)

FOREIGN PATENT DOCUMENTS

| | | |
|---|---|---|
| EP | 0563832 A1 | 10/1993 |
| EP | 0875999 A2 | 11/1998 |

(Continued)

OTHER PUBLICATIONS

"Fourth Edition of MPEG-2 AAC" MPEG Meeting Apr. 2005, Motion Picture Expert Group or ISO/IEC JTC1/SC29/WG11.

(Continued)

*Primary Examiner* — Daniel C Washburn
*Assistant Examiner* — Paul J. Mueller

(57) ABSTRACT

In some implementations, a method of encoding a low-frequency effect (LFE) channel comprises: receiving a time-domain LFL channel signal; filtering, using a low-pass filter, the time-domain LFE channel signal; converting the filtered time-domain LFE channel signal into a frequency-domain representation of the LFE channel signal that includes a number of coefficients representing a frequency spectrum of the LFL channel signal; arranging coefficients into a number of subband groups corresponding to different frequency
(Continued)

bands of the LFE channel signal; quantizing coefficients in each subband group according to a frequency response curve of the low-pass filter; encoding the quantized coefficients in each subband group using an entropy coder tuned for the subband group; and generating a bitstream including the encoded quantized coefficients; and storing the bitstream on a storage device or streaming the bitstream to a downstream device.

3 Claims, 8 Drawing Sheets

(51) Int. Cl.
*G10L 19/032* (2013.01)
*G10L 19/16* (2013.01)
*G10L 25/18* (2013.01)
*G10L 25/21* (2013.01)

(52) U.S. Cl.
CPC ............ *G10L 19/167* (2013.01); *G10L 25/18* (2013.01); *G10L 25/21* (2013.01)

(56) References Cited

U.S. PATENT DOCUMENTS

| | | | | |
|---|---|---|---|---|
| 5,978,756 | A | 11/1999 | Walker | |
| 6,016,473 | A | 1/2000 | Dolby | |
| 6,226,616 | B1 | 5/2001 | You | |
| 7,885,721 | B2 | 2/2011 | Castillo | |
| 8,831,933 | B2 | 9/2014 | Duni | |
| 9,251,254 | B2 | 2/2016 | Nayak | |
| 9,324,332 | B2 | 4/2016 | Doehla | |
| 9,396,734 | B2 | 7/2016 | Mittal | |
| 9,779,737 | B2 | 10/2017 | Neuendorf | |
| 9,930,465 | B2 | 3/2018 | Villemoes | |
| 9,955,276 | B2 | 4/2018 | Purnhagen | |
| 10,424,309 | B2 | 9/2019 | Fuchs | |
| 10,431,230 | B2 | 10/2019 | Schnell | |
| 2004/0267543 | A1 | 12/2004 | Ojanpera | |
| 2005/0008171 | A1* | 1/2005 | Hosoi | H04S 3/008 381/98 |
| 2005/0091048 | A1* | 4/2005 | Thyssen | G10L 19/26 704/223 |
| 2006/0013493 | A1* | 1/2006 | Yang | H03M 7/4006 382/232 |
| 2007/0055513 | A1* | 3/2007 | Hwang | H04K 1/06 704/E21.006 |
| 2007/0112560 | A1* | 5/2007 | Gerrits | G10L 19/093 704/E19.03 |
| 2007/0225971 | A1 | 9/2007 | Bessette | |
| 2008/0077412 | A1 | 3/2008 | Oh | |
| 2009/0313029 | A1 | 12/2009 | Luo | |
| 2011/0103377 | A1* | 5/2011 | Hua | H04L 65/1053 370/352 |
| 2011/0106542 | A1* | 5/2011 | Bayer | G10L 19/167 704/503 |
| 2012/0095754 | A1* | 4/2012 | Lee | G10L 19/0212 704/E19.01 |
| 2014/0012588 | A1 | 1/2014 | Fellers | |
| 2014/0019125 | A1* | 1/2014 | Laaksonen | G10L 21/038 704/205 |
| 2014/0058737 | A1 | 2/2014 | Ishikawa | |
| 2014/0297706 | A1 | 10/2014 | Kishi | |
| 2015/0255076 | A1 | 9/2015 | Fejzo | |
| 2015/0348536 | A1* | 12/2015 | Ando | G10L 15/01 704/234 |
| 2015/0351028 | A1* | 12/2015 | Vallath | H04L 65/1104 370/311 |
| 2016/0012825 | A1 | 1/2016 | Kristofer | |
| 2016/0055855 | A1* | 2/2016 | Kjoerling | G10L 19/032 704/500 |
| 2016/0247515 | A1 | 8/2016 | Koishida | |
| 2016/0267914 | A1 | 9/2016 | Hu | |
| 2017/0230777 | A1* | 8/2017 | Seldess | H04S 7/304 |
| 2017/0301362 | A1 | 10/2017 | Kristofer | |
| 2018/0136872 | A1* | 5/2018 | Du | G11C 11/54 |
| 2018/0322886 | A1 | 11/2018 | Villemoes | |
| 2019/0304475 | A1* | 10/2019 | Shahbazi Mirzahasanloo | G10L 19/002 |
| 2020/0387797 | A1* | 12/2020 | Ryan | G06N 3/084 |
| 2021/0084432 | A1* | 3/2021 | Salem | G06F 3/165 |
| 2022/0286713 | A1* | 9/2022 | Oh | G06T 9/00 |

FOREIGN PATENT DOCUMENTS

| | | | |
|---|---|---|---|
| EP | 0864146 | B1 | 10/2004 |
| JP | 2010204533 | A | 9/2010 |
| JP | 5817011 | B1 | 11/2015 |
| RU | 2583717 | C1 | 5/2016 |
| RU | 2625444 | C2 | 7/2017 |

OTHER PUBLICATIONS

Berbakov, L. et al "Evaluation of Different AAC Codec Realizations for Audio Mobile Device based on ARM Architecture" WSEAS Transactions on Communications, vol. 17 2018, pp. 53-59.

Chen, Yu-Chi, et al."Fast Time-Frequency Transform Algorithms and Their Applications to Real-Time Software Implementation of AC-3 Audio Codec" IEEE Transactions on Consumer Electronics, vol. 44, No. 2, May 1998, pp. 413-423.

ISO/IEC 13818-3 "Information Technology—Generic Coding of Moving Pictures and Associated Audio Information—Part 3: Audio" Apr. 30, 1998, pp. 1-115.

Johnston, J. D. et al "MPEG-2 NBC Audio—Stereo and Multichannel Coding Methods" AES Convention Nov. 8, 1996, pp. 1-16.

WD on MPEG-4 Audio Fourth Edition MPEG Meet! NG; Jan. 15, 2007-Jan. 19, 2007; 18 Marrakech; (Motion Picture Expert Group or ISO/IEC JTC1/SC29/WG11), Jan. 19, 2007 (Jan. 19, 2007).

Information technology—Generic Coding of Moving Pictures and Audio: Audio, Publication data: ISO/IEC 13818-3, Feb. 20, 1997, pp. 1-127.

Information Technology—Generic coding of moving pictures and associate audio information—Part 3: Audio. ISO/IEC 13818-3:1998, IEC, 3, Rue de Varembe, PO Box 131, CH-1211 Geneva 20, Switzerland, Apr. 1998, pp. 1-26, 126 pages.

Backstrom, T., "Overlap-Add Windows With Maximum Energy Concentration For Speech And Audio Processing", ICASSP 2019—2019 IEEE International Conference on Acoustics, Speech and Signal Processing (ICASSP), doi:10.1109/ICASSP.2019.8683577, Apr. 17, 2019, pp. 491-495, 6 pages.

IEEE Standards Association, "IEEE Standards for Advanced Audio Coding", doi:10.1109/IEEESTD.2013.6658828, Nov. 12, 2013, pp. 1-166, 178 pages.

* cited by examiner

LOW-LATENCY, LOW-FREQUENCY EFFECTS CODEC

CROSS-REFERENCE TO RELATED APPLICATIONS

This application claims priority to U.S. Provisional Patent Application No. 62/895,049, filed 3 Sep. 2019, and U.S. Provisional Patent Application No. 63/069,420, filed 24 Aug. 2020, each of which is incorporated by reference in its entirety.

TECHNICAL FIELD

This disclosure relates generally to audio signal processing, and in particular, to processing low-frequency effects (LFE) channels.

BACKGROUND

Standardization efforts for immersive services include development of an Immersive Voice and Audio Service (IVAS) codec for voice, multi-stream teleconferencing, virtual reality (VR), user generated live and non-live content streaming, for example. A goal of the IVAS standard is to develop a single codec with excellent audio quality, low latency, spatial audio coding support, an appropriate range of bitrates, high-quality error resiliency and a practical implementation complexity. To achieve this goal, it is desired to develop an IVAS codec that can handle low-latency LFE operations on IVAS-enabled devices or any other devices capable of processing LFE signals. The LFE channel is intended for deep, low-pitched sounds ranging from 20-120 Hz, and is typically sent to a speaker that is designed to reproduce low-frequency audio content.

SUMMARY

Implementations are disclosed for a configurable low-latency LFE codec.

In some implementations, a method of encoding a low-frequency effect (LFE) channel comprises: receiving, using one or more processors, a time-domain LFE channel signal; filtering, using a low-pass filter, the time-domain LFE channel signal; converting, using the one or more processors, the filtered time-domain LFE channel signal into a frequency-domain representation of the LFE channel signal that includes a number of coefficients representing a frequency spectrum of the LFE channel signal; arranging, using the one or more processors, coefficients into a number of subband groups corresponding to different frequency bands of the LFE channel signal; quantizing, using the one or more processors, coefficients in each subband group according to a frequency response curve of the low-pass filter; encoding, using the one or more processors, the quantized coefficients in each subband group using an entropy coder tuned for the subband group; and generating, using the one or more processors, a bitstream including the encoded quantized coefficients; and storing, using the one or more processors, the bitstream on a storage device or streaming the bitstream to a downstream device.

In some implementations, quantizing the coefficients in each subband group, further comprises generating a scaling shift factor based on a maximum number of quantization points available and a sum of the absolute values of the coefficients; and quantizing the coefficients using the scaling shift factor.

In some implementations, if a quantized coefficient exceeds the maximum number of quantization points the scaling shift factor is reduced and the coefficients are quantized again.

In some implementations, the quantization points are different for each subband group.

In some implementations, the coefficients in each subband group are quantized according to a fine quantization scheme or a coarse quantization scheme, wherein with the fine quantization scheme more quantization points are allocated to one or more subband groups than assigned to the respective subband groups according to the coarse quantization scheme.

In some implementations, sign bits for the coefficients are coded separately from the coefficients.

In some implementations, there are four subband groups, and a first subband group corresponds to a first frequency range of 0-100 Hz, a second subband group corresponds to a second frequency range of 100-200 Hz, a third subband group corresponds to a third frequency range of 200-300 Hz and a fourth subband group corresponds to a fourth frequency range of 300-400 Hz.

In some implementations, the entropy coder is an arithmetic entropy coder.

In some implementations, converting the filtered time-domain LFE channel signal into a frequency-domain representation of the LFE channel signal that includes a number of coefficients representing a frequency spectrum of the LFE channel signal, further comprises: determining a first stride length of the LFE channel signal; designating a first window size of a windowing function based on the first stride length; applying the first window size to one or more frames of the time-domain LFE channel signal; and applying a modified discrete cosine transform (MDCT) to the windowed frames to generate the coefficients.

In some implementations, the method further comprises: determining a second stride length of the LFE channel signal; designating a second window size of the windowing function based on the second stride length; and applying the second window size to the one or more frames of the time-domain LFE channel signal In some implementations, the first stride length is N milliseconds (ms), N is greater than or equal to 5 ms and less than or equal to 60 ms, the first window size is higher than or equal to 10 ms, the second stride length is 5 ms and the second window size is 10 ms.

In some implementations, the first stride length is 20 milliseconds (ms), the first window size is 10 ms or 20 ms or 40 ms, the second stride length is 10 ms and the second window size is 10 ms or 20 ms.

In some implementations, the first stride length is 10 milliseconds (ms), the first window size is 10 ms or 20 ms, the second stride length is 5 ms, and the second window size is 10 ms.

In some implementations, the first stride length is 20 milliseconds (ms), the first window size is 10 ms, 20 ms, or 40 ms, the second stride length is 5 ms and the second window size is 10 ms.

In some implementations, the windowing function is a Kaiser-Bessel-derived (KBD) windowing function with a configurable fade length.

In some implementations, the low-pass filter is a fourth order Butterworth filter low-pass filter with a cut-off frequency of about 130 Hz or lower.

In some implementations, the method further comprises: determining, using the one or more processors, whether an energy level of a frame of the LFE channel signal is below a threshold; in accordance with the energy level being below a threshold level, generating a silent frame indicator indicating that the decoder; inserting the silent frame indicator into metadata of the LFE channel bitstream; and reducing an LFE channel bitrate upon silent frame detection.

In some implementations, a method of decoding a low-frequency effect (LFE) comprises: receiving, using one or more processors, an LFE channel bitstream, the LFE channel bitstream including entropy coded coefficients representing a frequency spectrum of a time-domain LFE channel signal; decoding, using the one or more processors, the quantized coefficients using an entropy decoder; inverse quantizing, using the one or more processors, the inverse quantized coefficients, wherein the coefficients were quantized in subband groups corresponding to frequency bands according to a frequency response curve of a low-pass filter used to filter the time-domain LFE channel signal in an encoder; converting, using the one or more processors, the inverse quantized coefficients to a time-domain LFE channel signal; adjusting, using the one or more processors, a delay of the time-domain LFE channel signal; and filtering, using a low-pass filter, the delay adjusted LFE channel signal.

In some implementations, an order of the low-pass filter is configured to ensure that a first total algorithmic delay due to encoding and decoding the LFE channel is less than or equal to a second total algorithmic delay due to encoding and decoding other audio channels of a multichannel audio signal that includes the LFE channel signal.

In some implementations, the method further comprises: determining whether the second total algorithmic delay exceeds a threshold value; and in accordance with the second total algorithmic delay exceeding the threshold value, configuring the low-pass filter as an $N^{th}$ order low-pass filter, where N is an integer greater than or equal to two; and in accordance with the second total algorithmic delay not exceeding the threshold value, configuring the order of the low-pass filter to be less than N.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular embodiments disclosed herein provide one or more of the following advantages. The disclosed low-latency LFE codec: 1) primarily targets the LFE channel; 2) primarily targets a frequency range of 20 to 120 Hz, but carries audio out to 300 Hz in low/medium bitrate scenarios and out to 400 Hz in high bitrate scenarios; 3) achieves a low bitrate by applying a quantization scheme according to a frequency response curve an input low-pass filter; 4) has a low algorithmic latency and is designed to operate at a stride of 20 milliseconds (ms) and have a total algorithmic latency (including framing) of 33 msec; 5) can be configured to smaller strides and lower algorithmic latency to support other scenarios, including configurations down to strides of 5 msec and total algorithmic latency (including framing) of 13 msec; 6) automatically chooses a low-pass filter at the decoder output based on the latency available with the LFE codec; 7) has a silence mode with a low bitrate of 50 bits per second (bps) during silence; and 8) during active frames the bitrate fluctuates between 2 kilobits per second (kbps) to 4 kbps based on the quantization level used, and during silence frames the bitrate is 50 bps.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes", and its variants are to be read as open-ended terms that mean "includes but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

System Overview

Figure 1:
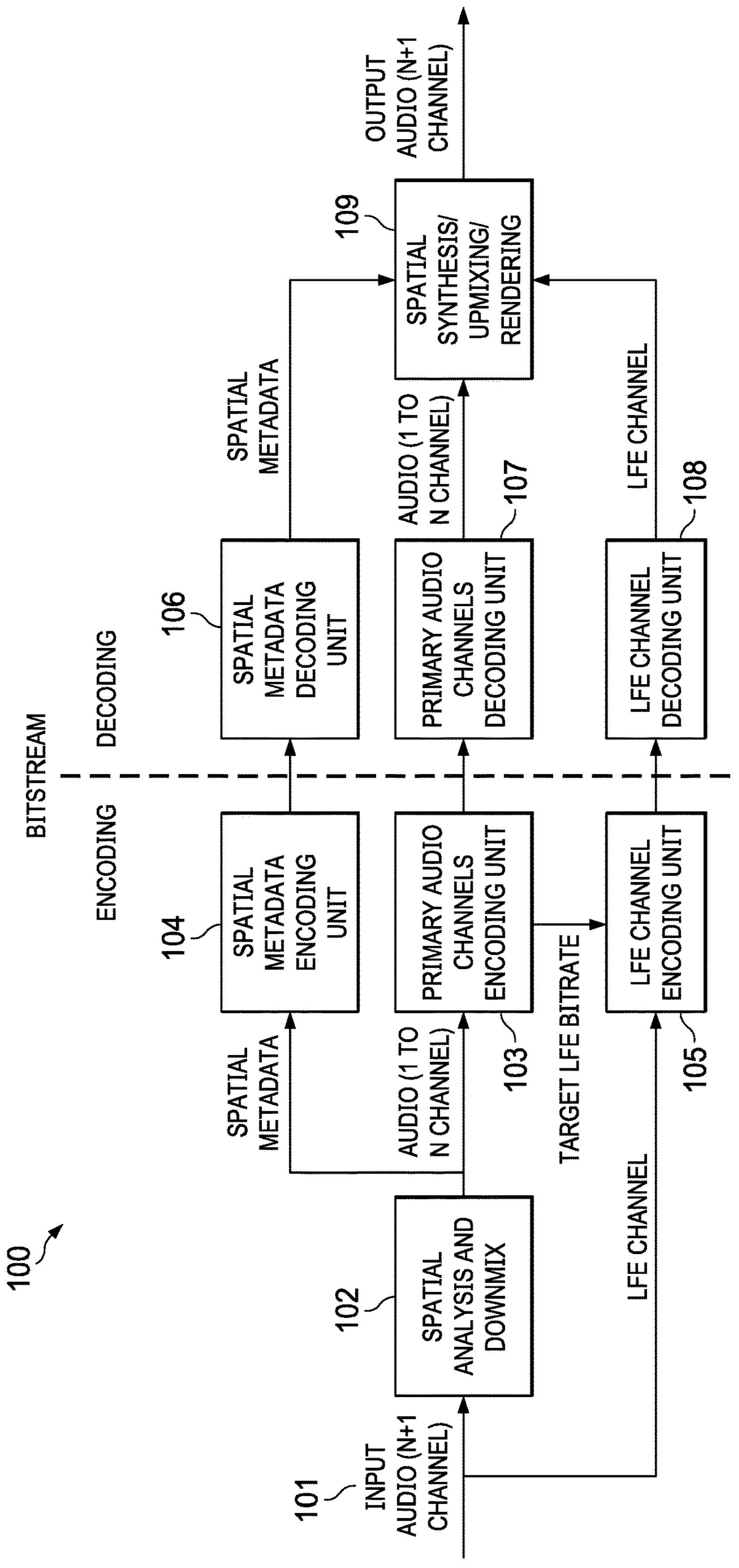
FIG. 1 illustrates an IVAS codec for encoding and decoding IVAS and LFE bitstreams, according to one or more implementations.

FIG. 1 illustrates an IVAS codec 100 for encoding and decoding IVAS bitstreams, including an LFE channel bitstream, according to one or more implementations. For encoding, IVAS codec 100 receives N+1 channels of audio data 101, where N channels of audio data 101 are input into spatial analysis and downmix unit 102 and one LFE channel is input into LFE channel encoding unit 105. Audio data 101 includes but is not limited to: mono signals, stereo signals, binaural signals, spatial audio signals (e.g., multi-channel spatial audio objects), first order Ambisonics (FoA), higher order Ambisonics (HoA) and any other audio data.

In some implementations, spatial analysis and downmix unit 102 is configured to implement complex advance coupling (CACPL) for analyzing/downmixing stereo audio data and/or spatial reconstruction (SPAR) for analyzing/downmixing FoA audio data. In other implementations, spatial analysis and downmix unit 102 implements other formats. The output of spatial analysis and downmix unit 102 includes spatial metadata, and 1 to N channels of audio data. The spatial metadata is input into spatial metadata encoding unit 104, which is configured to quantize and entropy code the spatial metadata. In some implementations, quantization can include fine, moderate, course and extra course quantization strategies and entropy coding can include Huffman or Arithmetic coding.

The 1 to N channels of audio data are input into primary audio channel encoding unit 103 which is configured to encode the 1 to N channels of audio data into one or more enhanced voice services (EVS) bitstreams. In some implementations, primary audio channel encoding unit 103 complies with 3GPP TS 26.445 and provides a wide range of functionalities, such as enhanced quality and coding efficiency for narrowband (EVS-NB) and wideband (EVS-WB) speech services, enhanced quality using super-wideband (EVS-SWB) speech, enhanced quality for mixed content and music in conversational applications, robustness to packet loss and delay jitter and backward compatibility to the AMR-WB codec.

In some implementations, primary audio channel encoding unit 103 includes a pre-processing and mode selection unit that selects between a speech coder for encoding speech signals and a perceptual coder for encoding audio signals at a specified bitrate based on mode/bitrate control. In some implementations, the speech encoder is an improved variant of algebraic code-excited linear prediction (ACELP), extended with specialized LP-based modes for different speech classes.

In some implementations, the audio encoder is a modified discrete cosine transform (MDCT) encoder with increased efficiency at low delay/low bitrates and is designed to perform seamless and reliable switching between the speech and audio encoders.

As previously described, the LFE channel signal is intended for deep, low-pitched sounds ranging from 20-120 Hz, and is typically sent to a speaker that is designed to reproduce low-frequency audio content (e.g., a subwoofer). The LFE channel signal is input into LFE channel signal encoding unit 105 which is configured to encode the LFE channel signal as described in reference to FIG. 2A.

In some implementations, an IVAS decoder includes spatial metadata decoding unit 106 which is configured to recover the spatial metadata, and primary audio channel decoding unit 107 which is configured to recover the 1 to N channel audio signals. The recovered spatial metadata and recovered 1 to N channel audio signals are input into spatial synthesis/upmixing/rendering unit 109, which is configured to synthesize and render the 1 to N channel audio signals into N or more channel output audio signals using the spatial metadata for playback on speakers of various audio systems, including but not limited to: home theatre systems, video conference room systems, virtual reality (VR) gear and any other audio system that is capable of rendering audio. LFE channel decoding unit 108 receives the LFE bitstream and is configured to decode the LFE bitstream, as described in reference to FIG. 2B.

Although the example implementation of LFE encoding/decoding described above is performed by an IVAS codec, the low-latency LFE codec described below can be a standalone LFE codec, or it can be included in any proprietary or standardized audio codec that encodes and decodes low-frequency signals in audio applications where low-latency and configurability is required or desired.

Figure 2A:
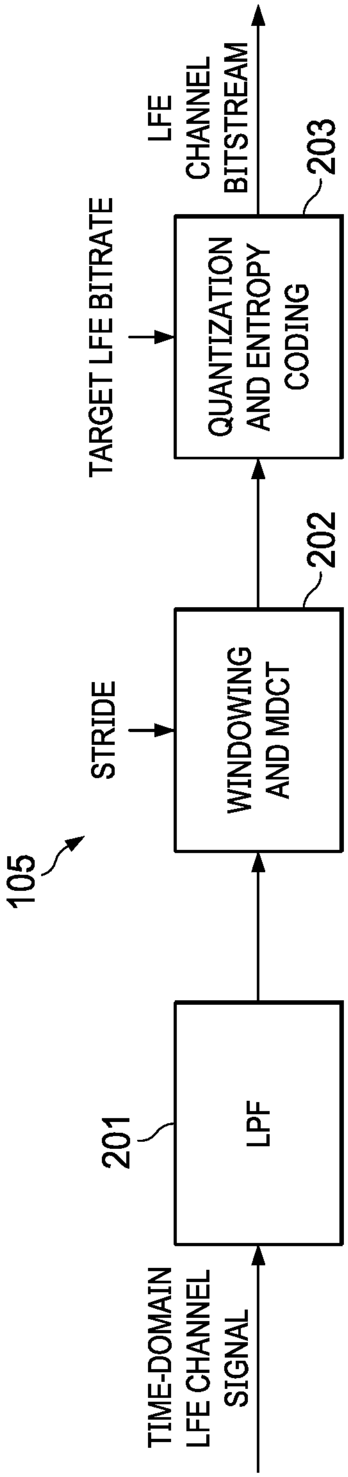
FIG. 2A is a block diagram illustrating LFE encoding, according to one or more implementations.
Figure 2B:
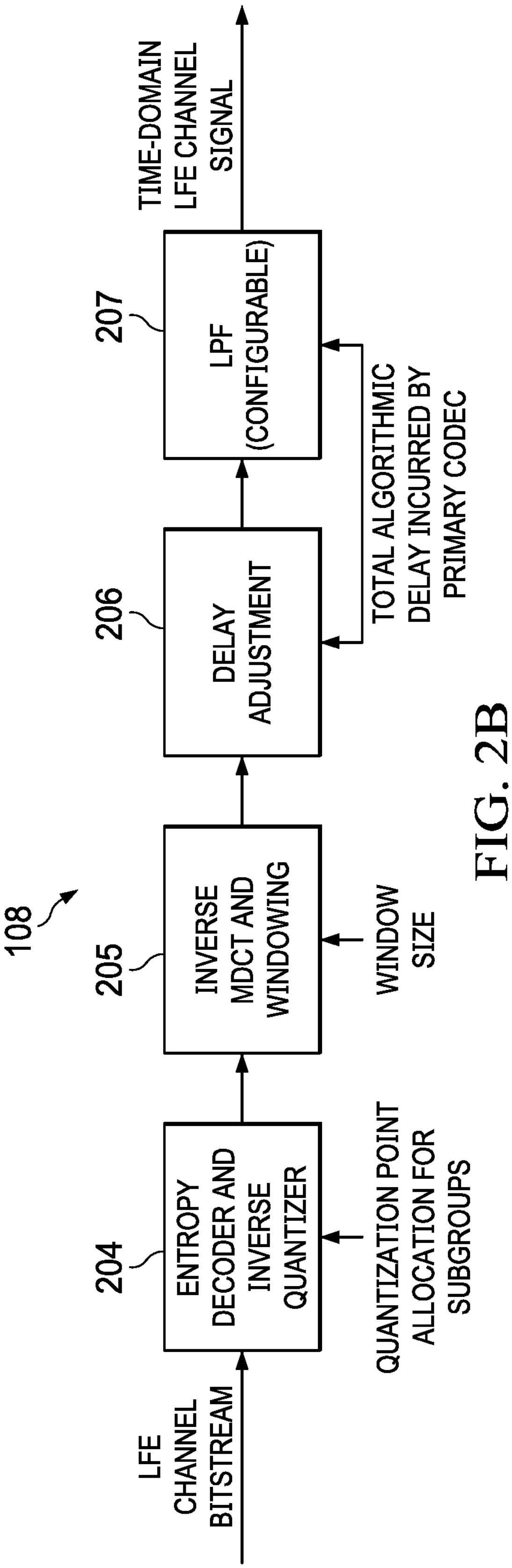
FIG. 2B is a block diagram illustrating LFE decoding, according to one or more implementations.

FIG. 2A is a block diagram illustrating functional components of LFE channel encoding unit 105 shown in FIG. 1, according to one or more embodiments. FIG. 2B is a block diagram illustrating functional components of LFE channel decoder 108 shown in FIG. 1, according to one or more embodiments. LFE channel decoder 108 includes entropy decoding and inverse quantization unit 204, inverse MDCT and windowing unit 205, delay adjustment unit 206 and output LPF 207. Delay adjustment unit 206 can be before or after LPF 207, and performs delay adjustment (e.g., by buffering the decoded LFE channel signal) to match the decoded LFE channel signal and the primary codec decoded output. Hereinafter, the LFE channel encoding unit 105 and the LFE channel decoding unit 108 described in reference to FIG. 2B are collectively referred to as an LFE codec.

LFE channel encoding unit 105 includes input low-pass filter (LPF) 201, windowing and MDCT unit 202 and quantization and entropy coding unit 203. In an embodiment, the input audio signal is a pulse code modulated (PCM) audio signal, and LFE channel encoding unit 105 expects an input audio signal with a stride of either 5 milliseconds, 10 milliseconds or 20 milliseconds. Internally, LFE channel encoding unit 105 operates on 5 millisecond or 10 millisecond subframes and windowing and MDCT is performed on a combination of these subframes. In an embodiment, LFE channel encoding unit 105 runs with a 20 milliseconds input stride and internally divides this input into two subframes of equal length. The last subframe of previous input frame to LFE is concatenated with the first subframe of current input frame to LFE and windowed. The first subframe of current input frame to LFE is concatenated with the second subframe of current input frame to LFE and windowed. MDCT is performed twice, once on each windowed block.

In an embodiment, the algorithmic delay (without framing delay) is equal to 8 milliseconds plus the delay incurred by input LPF 103 plus the delay incurred by output LPF 207. With a 4th-order input LPF 201 and $4^{th}$-order output LPF 207, the total system latency is approximately 15 milliseconds. With a 4th-order input LPF 201 and a 2nd-order output LPF 207, the total LFE codec latency is approximately 13 milliseconds.

Figure 3:
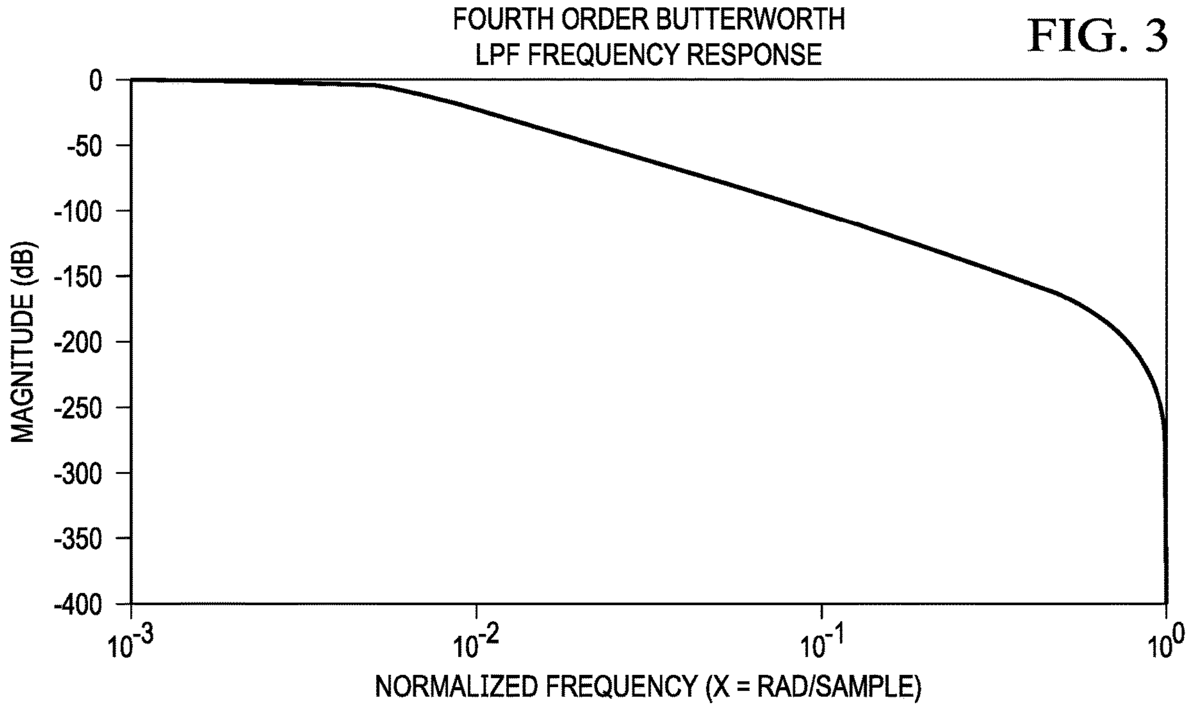
FIG. 3 is a plot illustrating a frequency response of $4^{th}$ order Butterworth low-pass filter with a corner a cut-off of 130 Hz, according to one or more implementations.

FIG. 3 is a plot illustrating a frequency response of an example input LPF 201, according to one or more embodiments. In the example shown LPF 201 is a 4th-order Butterworth filter with a cut-off frequency of 130 Hz. Other embodiments may use a different type of LPF (e.g., a Chebyshev, Bessel) with the same or different order and the same or different cut-off frequency.

Figure 4:
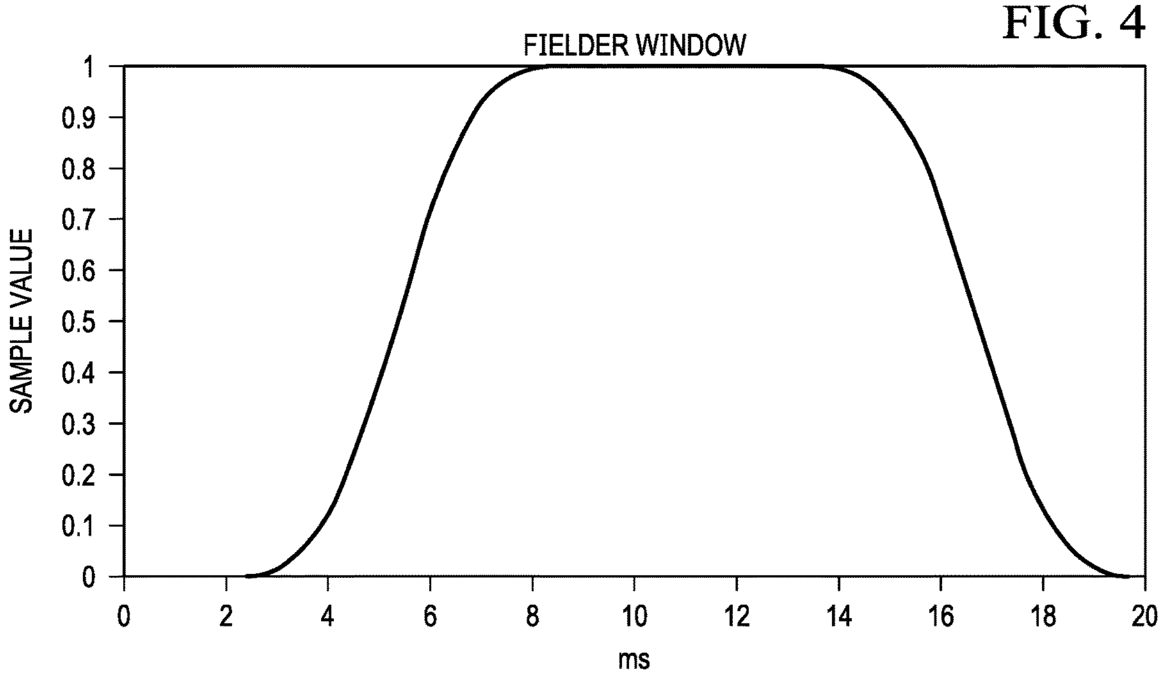
FIG. 4 is a plot illustrating a Fielder window, according to one or more implementations.

FIG. 4 is a plot illustrating a Fielder window, according to one or more embodiments. In an embodiment, the windowing function applied by windowing and MDCT unit 202 is a Fielder window function with a fade length of 8 milliseconds. The Fielder window is a Kaiser-Bessel-derived (KBD) window with alpha=5, which is a window that by construction satisfies the Princen-Bradley condition for the MDCT and is thus used with in Advanced Audio Coding (AAC) digital audio format. Other windowing functions can also be used.

Quantization and Entropy Coding

In an embodiment, quantization and entropy coding unit 203 implements a quantization strategy that follows the input LPF 201 frequency response curve to quantize the MDCT coefficients more efficiently. In an embodiment, the frequency range is divided into 4 subband groups representing 4 frequency bands: 0-100 Hz, 100-200 Hz, 200-300 Hz and 300-400 Hz. These bands are examples and more or fewer bands can be used with the same or different frequency ranges. More particularly, the MDCT coefficients are quantized using a scaling shift factor that is dynamically computed based on the MDCT coefficient values in a particular frame and the quantization points are selected as per the LPF frequency response curve, as shown in FIGS. 5-8. This quantization strategy helps reduce the quantization points for the MDCT coefficients belonging to 100-200 Hz, 200-300 Hz and 300-400 Hz bands, while keeping optimal quantization points for the primary LFE band of 0-100 Hz, which is where the energy of most low-frequency effects (e.g., rumbling) will be found.

In an embodiment, a quantization strategy for a $F_{len}$ millisecond (ms) input PCM stride (input frame length) to LFE channel encoding unit 105, is described below where the frame length, $F_{len}$, can take any value given by 5*f ms, here 1<=f<=12.

First, the input PCM stride is divided into N subframes of equal lengths, each subframe width $(S_w)=F_{len}/N$ ms. N should be selected such that each SW is a multiple of 5 ms (For example, if $F_{len}$=20 ms then N can be 1, 2 or 4; if $F_{len}$=10 ms then N can be 1 or 2; and if $F_{len}$=5 ms then N is equal to 1). Let $S_i$ be the $i^{th}$ subframe in any given frame, here i is an integer with range 0<=i<=N, where $S_0$ corresponds to the last subframe of previous input frame to LFE encoding unit 105 and $S_1$ to $S_N$ are the N subframes of the current frame.

Next, every $S_i$ and $S_{i+1}$ subframe is concatenated and windowed with a Fielder window (see FIG. 4) and then MDCT is performed on these windowed samples. This results in a total of N MDCTs for every frame. The number of MDCT coefficients from each MDCT (num_coeffs)=sampling frequency*$S_w$/1000. The frequency resolution of each MDCT (width of each MDCT coefficient) ($W_{mdct}$) is around 1000/(2*$S_w$) Hz. Given that subwoofers typically have a LPF cut-off around 100-120 Hz, and the post-LPF energy after 400 Hz is typically very low, MDCT coefficients up to 400 Hz are quantized and sent to the LFE decoding unit 108 while the rest of the MDCT coefficients are quantized to 0. Sending MDCT coefficients up to 400 Hz ensures high quality reconstruction of up to 120 Hz at the LFE decoding unit 108. The total number of MDCT coefficients to quantize and code ($N_{quant}$) is therefore equal to N*400/$W_{mdct}$.

Next, the MDCT coefficients are arranged in M subband groups where the width of each subband group is a multiple of $W_{mdct}$ and the sum of the widths of all the subband groups is equal to 400 Hz. Let the width of each subband be $SBW_m$ Hz, where m is an integer with range 1<=m<=M. With this width, the number of coefficients in the $m^{th}$ subband group=$SN_{quant}$=N*$SBW_m$/$W_{mdct}$ (i.e., $SBW_m/W_{mdct}$ coefficients from each MDCT). The MDCT coefficients in each subband group are then scaled with a shift scaling factor (shift), described below, determined by the sum or max of absolute values of all $N_{quant}$ MDCT coefficients. The scaled MDCT coefficients in each subband group are then quantized and coded separately using a quantization scheme that follows the LPF curve at the encoder input. Coding of quantized MDCT coefficients is done with an entropy coder (e.g., an Arithmetic or Huffman coder). Each subband group is coded with a different entropy coder and each entropy coder uses an appropriate probability distribution model to code the respective subband group efficiently.

An example quantization strategy for a 20 millisecond (ms) stride ($F_{len}$=20 ms), 2 subframes (N=2) and sampling frequency=48000 will now be described. With this example input configuration, subframe width $S_w$=10 ms and the number of MDCTs=N=2. The first MDCT is performed on a 20 ms block. This block is formed by concatenating a 10-20 ms subframe of the previous 20 ms input and a 0-10 ms subframe of the current 20 ms input, and then windowing with the 20 ms long Fielder window (see FIG. 4). With N=1 and N=4, the Fielder window is scaled accordingly, and the fade length is changed to 16/N ms. The second MDCT is performed on a 20 ms block formed by windowing the current 20 ms input frame with a 20 ms long Fielder window. The number of MDCT coefficients (num_coeffs) with each MDCT=480, the width of each MDCT coefficient $W_{mdct}$=50 Hz, the total number of coefficients to quantize and code $N_{quant}$=16 and the total number of coefficients to quantize and code per MDCT=16/N=8.

Next, the MDCT coefficients are arranged in 4 subband groups (M=4), where each subband group corresponds to a 100 Hz band (0-100, 100-200, 200-300, 300-400, $SBW_m$=100 Hz, number of coefficients in each subband group=$SN_{quant}$=N*$SBW_m$/$W_{mdct}$=4). Let $a_1$, $a_2$, $a_3$, $a_4$, $a_5$, $a_6$, $a_7$, $a_8$ be the first 8 MDCT coefficients to be quantized from the first MDCT and $b_1$, $b_2$, $b_3$, $b_4$, $b_5$, $b_6$, $b_7$, $b_8$ be the first 8 MDCT coefficients to be quantized from the second MDCT. The 4 subband groups are arranged to have the following coefficients:

subband group1={$a_1$, $a_2$, $b_1$, $b_2$}, subband group2={$a_3$, $a_4$, $b_3$, $b_4$}, subband group3={$a_5$, $a_6$, $b_5$, $b_6$}, subband group4={$a_7$, $a_8$, $b_7$, $b_8$}, where each subband group corresponds to a 100 Hz band.

A frame with a gain of around −30 dB (or less) can have MDCT coefficients with values on the order of $10^{-2}$ or $10^{-1}$, or even lower, while a frame with full scale gain can have MDCT coefficients with values 20 or above. To satisfy this wide range of values, a scaling shift factor (shift) is computed based on the maximum quantization points available (max_value) and a sum of the absolute value of the MDCT coefficients (lfe_dct_new) as follows:

shift=floor(shifts_per_double*log2(max_value/sum(abs(lfe_dct_new)))),

In an implementation, lfe_dct_new is an array of 16 MDCT coefficients, shifts_per_double is a constant (e.g., 4), max_value is an integer chosen for fine quantization (e.g., 63 quantization values) and for coarse quantization (e.g., is 31 quantization values), and shift is limited to a 5-bit value from 4 to 35 for fine quantization and 2 to 33 for coarse quantization.

The quantized MDCT coefficients are then computed as follows:

vals=round(lfe_dct_new*(2^(shift/shifts_per_double))), where the round( ) operation rounds the result to the nearest integer value.

If the quantized values (vals) exceeds the maximum allowed number of quantization points available (max_val), the scale shift factor (shift) is reduced and the quantized values (vals) are calculated again. In other implementations, instead of the sum function sum(abs(lfe_dct_new))), the max function max(abs(lfe_dct_new))) can be used to compute the scaling shift factor (shift), but the quantization values will be more scattered using the max( )function, making the design of an efficient entropy coder more difficult.

In the quantization steps described above, the quantized values for each subband group are calculated together in one loop , but the quantization points are different for each subband group. If the first subband group exceeds the allowed range, then the scaling shift factor is reduced. If any of the other subband groups exceeds the allowed range then that subband group is truncated to max_value. The sign bits for all the MDCT coefficients and the absolute value of the quantized MDCT coefficients are coded separately for each subband group.

Figure 5:
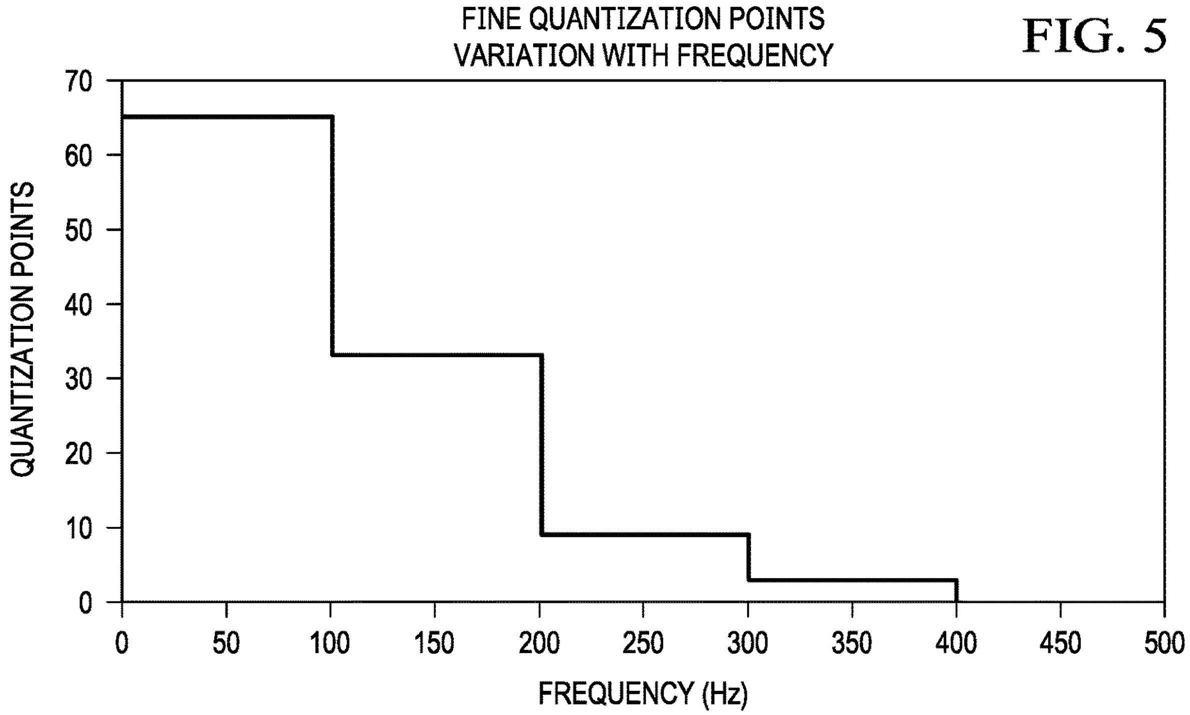
FIG. 5 illustrates the variation of fine quantization points with frequency, according to one or more implementations.

FIG. 5 illustrates the variation of fine quantization points with frequency, according to one or more implementations. With fine quantization, subband group 1 (0-100 Hz) has 64 quantization points, subband group 2 (100-200 Hz) has 32 quantization points, subband group 3 (200-300 Hz) has 8 quantization points and subband group 4 (300-400 Hz) has quantization 2 points. In an embodiment, each subband group is entropy coded with a separate entropy coder (e.g., an Arithmetic or Huffman entropy coder), where each entropy coder uses a different probability distribution. Accordingly, the primary 0-100 Hz range is allocated the most quantization points.

Note that the allocation of quantization points to the subband groups 1-4 follows the shape of the LPF frequency response curve, which has more information in the lower frequencies than the higher frequencies and no information outside the cut-off frequency. To reconstruct frequencies up to 130 Hz correctly, MDCT coefficients that correspond to frequencies above 130 Hz are also encoded to avoid or minimize aliasing. In some implementations, MDCT coefficients up to 400 Hz are encoded so that frequencies up to 130 Hz can be properly reconstructed at the decoding unit.

Figure 6:
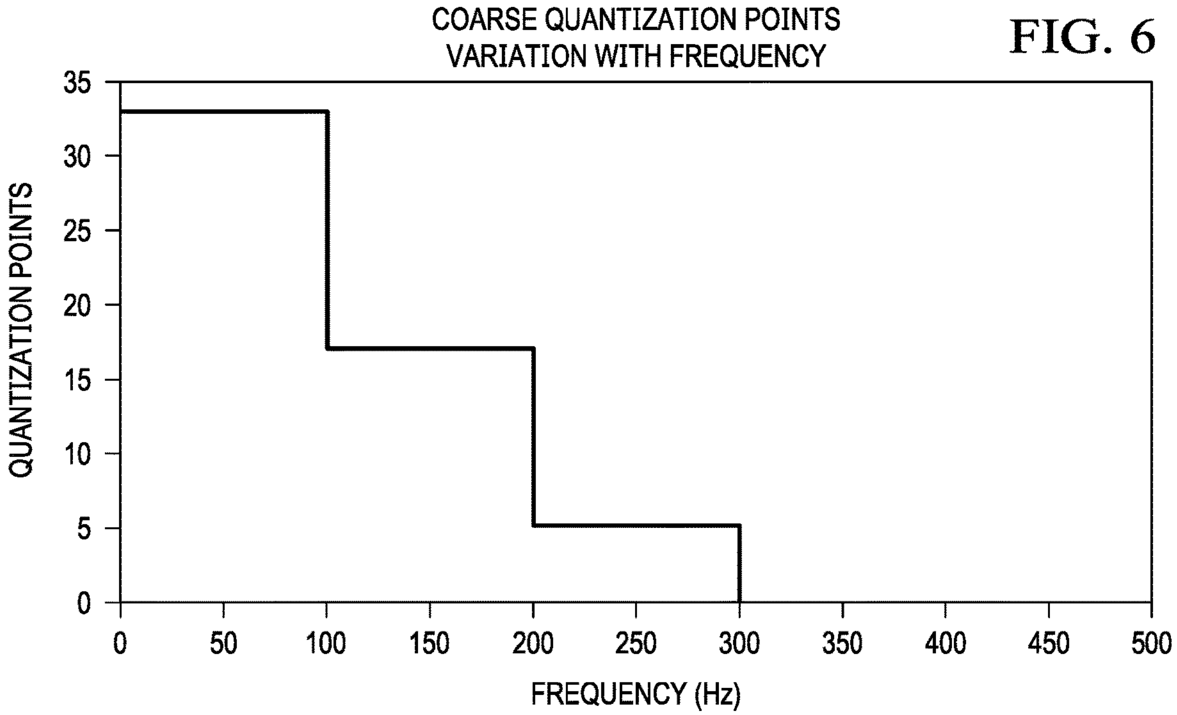
FIG. 6 illustrates the variation of coarse quantization points with frequency, according to one or more implementations.

FIG. 6 illustrates the variation of coarse quantization points with frequency, according to one or more implementations. With coarse quantization, subband group 1 (0-100 Hz) has 32 quantization points, subband group 2 (100-200 Hz) has 16 quantization points, subband group 3 (200-300 Hz) has 4 quantization points and subband group 4 (300-400 Hz) is not quantized and entropy coded. In an embodiment, each subband group is entropy coded with a separate entropy coder using a different probability distribution.

Figure 7:
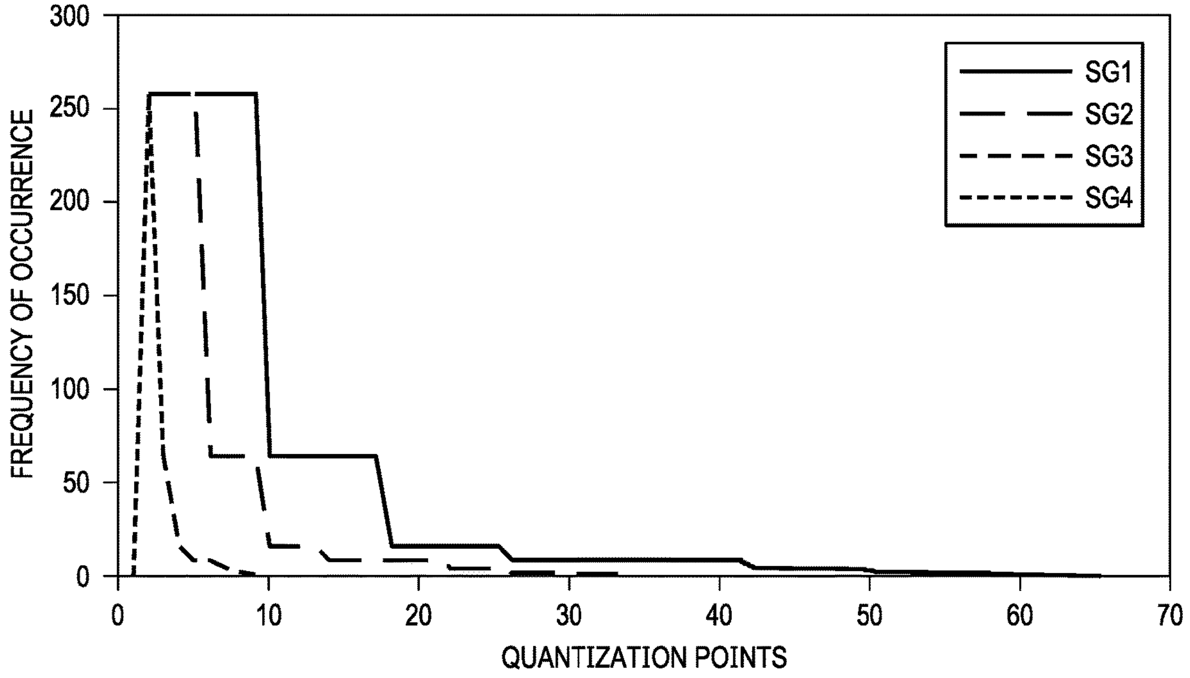
FIG. 7 illustrates a probability distribution of quantized MDCT coefficients with fine quantization, according to one or more implementations.

FIG. 7 illustrates a probability distribution of quantized MDCT coefficients with fine quantization, according to one or more implementations. The y-axis is the frequency of occurrence and the x-axis is the number of quantization points. Sgt is subband group 1 which corresponds to quantized MDCT coefficients in the 0-100 Hz band, Sg2 is subband group 2 which corresponds to quantized MDCT coefficients in the 100-200 Hz band. Sg3 is subband group 3 which corresponds to quantized MDCT coefficients in the 200-300 Hz band. Sg4 is subband group 4 which corresponds to quantized MDCT coefficients in band 300-400 Hz.

Figure 8:
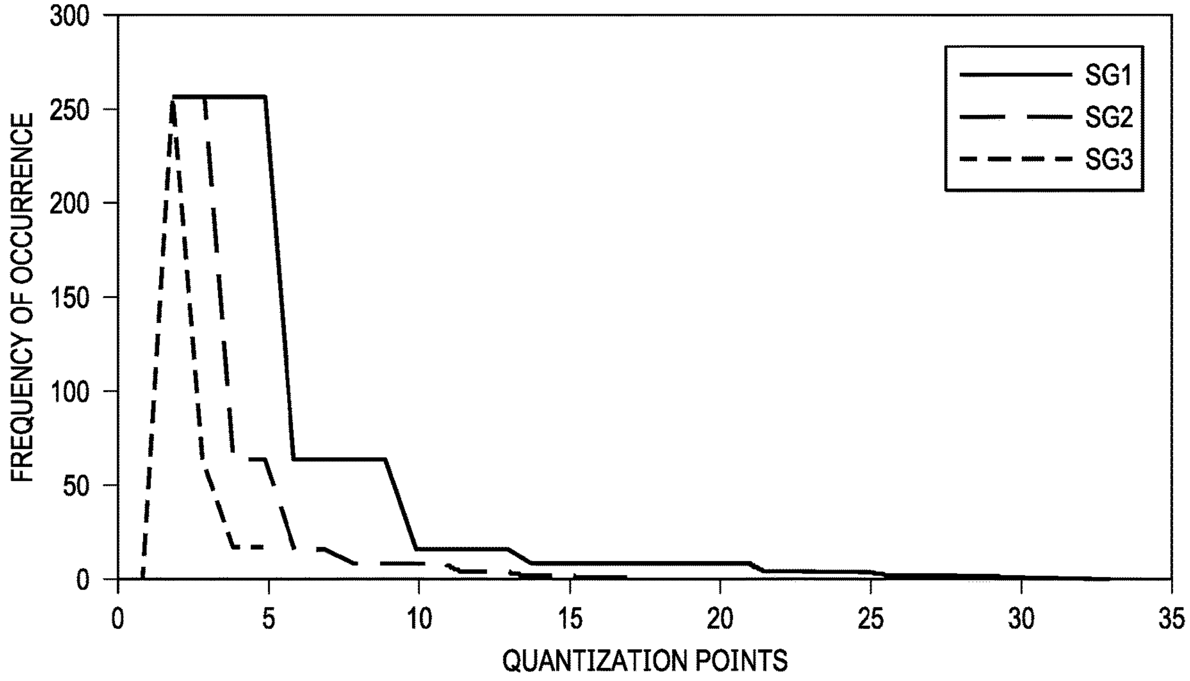
FIG. 8 illustrates a probability distribution of quantized MDCT coefficients with coarse quantization, according to one or more implementations.

FIG. 8 illustrates a probability distribution of quantized MDCT coefficients with coarse quantization, according to one or more implementations. The y-axis is the frequency of occurrence and the x-axis is the number of quantization points. Sgt is subband group 1 which corresponds to quantized MDCT coefficients in the 0-100 Hz band, Sg2 is subband group 2 which corresponds to quantized MDCT coefficients in the 100-200 Hz band. Sg3 is subband group 3 which corresponds to quantized MDCT coefficients in the 200-300 Hz band. Sg4 is subband group 4 which corresponds to quantized MDCT coefficients in band 300-400 Hz.

Note that the primary band (0-100 Hz) is where most of the LFE effects are found and therefore are allocated more quantization points for greater resolution. However, there are less bits allocated to the primary band in coarse quantization than for fine quantization. In an embodiment, whether fine quantization or coarse quantization is used for a frame of MDCT coefficients is dependent on the desired target bitrate set by primary audio channels encoder 103. Primary audio channels encoder 103 sets this value once during initialization or dynamically on a frame by frame basis based on the bits required or used to encode the primary audio channels in each frame.

Silence Frames

In some implementations, a signal is added in the LFE channel bitstream to indicate silence frames. A silence frame is a frame that has energy below a specified threshold. In some implementations, 1 bit is included in the LFE channel bitstream transmitted to decoder (e.g., inserted in the frame header) to indicate a silence frame, and all MDCT coefficients in the LFE channel bitstream are set to 0. This technique can reduce the bitrate to 50 bps during silence frames.

Decoder LPF

Two options for implementing LPF 207 (see FIG. 2B) are provided at the output of LFE channel decoding unit 108. LPF 207 is selected based on the available delay (total delay of other audio channels minus LFE fading delay minus input LPF delay). Note that other channels are expected to be encoded/decoded by primary audio channel encoding/decoding units 103, 107, and the delays for those channels depends on the algorithmic delay of primary audio channel encoding/decoding units 103, 107.

In an implementation, if the available delay is less than 3.5 ms then a 2nd order Butterworth LPF with cut-off at 130 Hz is used; otherwise a 4th order Butterworth LPF with cut-off at 130 Hz is used. Thus, at the LFE channel decoding unit 108 there is a tradeoff between removal of aliased energy beyond the cutoff frequency and algorithmic delay. In some implementations, LPF 207 can be removed completely as subwoofers usually have an LPF. LPF 207 helps to reduce the aliased energy beyond the cutoff at the LFE decoder output itself and can help in efficient post processing.

Example Processes

Figure 9:
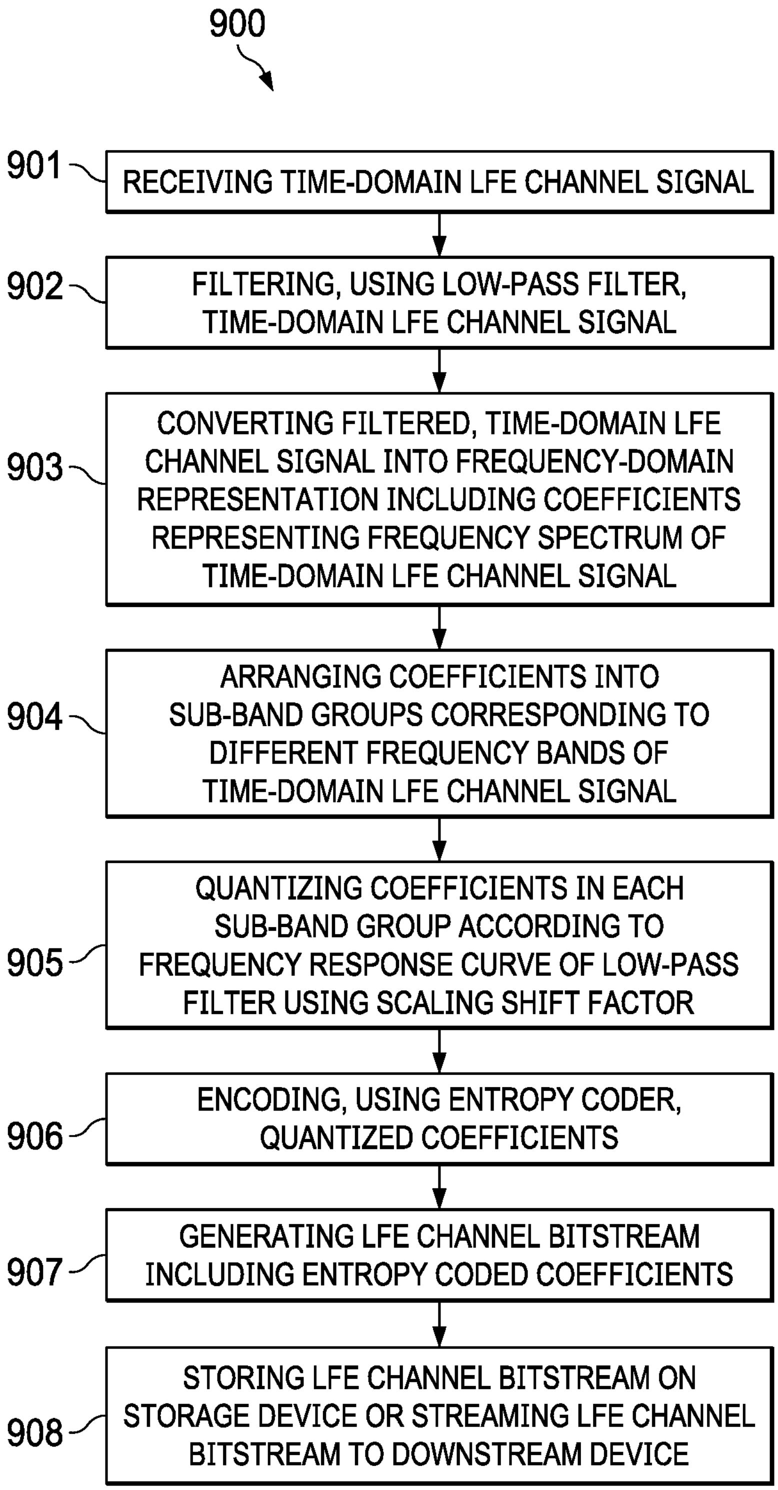
FIG. 9 is a flow diagram of a process of encoding modified discrete cosine transform (MDCT) coefficients, according to one or more implementations.

FIG. 9 is a flow diagram of a process 900 of encoding MDCT coefficients, according to one or more implementations. Process 900 can be implemented using, for example, system 1100, described in reference to FIG. 11.

Process 900 includes the steps of: receiving a time-domain LFE channel signal (901), filtering, using a low-pass filter, the time-domain LFE channel signal (902), converting the filtered time-domain LFE channel signal into a frequency-domain representation of the LFE channel signal that includes a number of coefficients representing a frequency spectrum of the LFE channel signal (903); arranging coefficients into a number of subband groups corresponding to different frequency bands of the LFE channel signal (904); quantizing coefficients in each subband group according to a frequency response curve of the low-pass filter using scaling shift factor (905); encoding the quantized coefficients in each subband group using an entropy coder configured for the subband group (906); generating a bitstream including the encoded quantized coefficients (907); and storing the bitstream on a storage device or streaming the bitstream to a downstream device (908).

Figure 10:
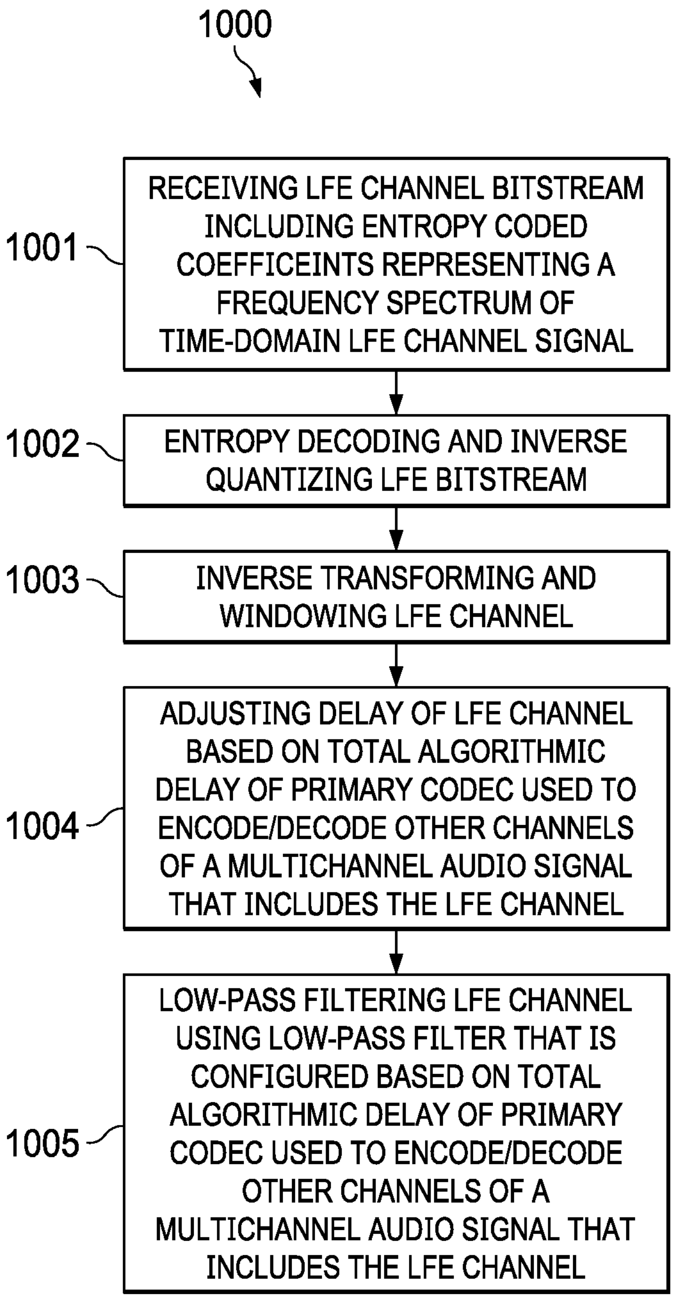
FIG. 10 is a flow diagram of a process of decoding modified discrete cosine transform (MDCT) coefficients, according to one or more implementations.

FIG. 10 is a flow diagram of a process 1000 of decoding MDCT coefficients, according to one or more implementations. Process 1000 can be implemented using, for example, system 1100, described in reference to FIG. 11.

Process 1000 includes the steps of: receiving an LFE channel bitstream (1001), where the LFE channel bitstream includes entropy coded coefficients representing a frequency spectrum of a time-domain LFE channel signal; decoding and inverse quantizing the coefficients (1002), wherein the coefficients were quantized in subband groups corresponding to different frequency bands according to a frequency response curve of a low-pass filter using a scaling shift factor; converting, the decoded and inverse quantized coefficients to a time-domain LFE channel signal (1003); adjusting a delay of the time-domain LFE channel signal (1004); and filtering, using a low-pass filter, the delay adjusted LFE channel signal (1005). In an embodiment, the order of the low-pass filter can be configured based on a total algorithmic delay available from a primary codec used to encode/decode full bandwidth channels of a multichannel audio signal that includes the time-domain LFE channel signal. In some implementations, the decoding unit only needs to know whether the MDCT coefficients were encoded with fine or coarse quantization by the encoding unit. The type of quantization can be indicated using a bit in the LFE bitstream header or any other suitable signalling mechanism In some implementations, the decoding of inverse quantized coefficients to time domain PCM samples is performed as follows. The inverse quantized coefficients in each subband group are rearranged into N groups (N is the number of MDCTs computed at the encoding unit), where each group has coefficients corresponding to the respective MDCT. As per the example implementation described above, the encoding unit encodes the following 4 subband groups:

subband group 1=$\{a_1, a_2, b_1, b_2\}$,
subband group 2=$\{a_3, a_4, b_3, b_4\}$,
subband group 3=$\{a_5, a_6, b_5, b_6\}$,
subband group 4=$\{a_7, a_8, b_7, b_8\}$.

The decoding unit decodes the 4 subband groups and rearranges them back to $\{a_1, a_2, a_3, a_4, a_5, a_6, a_7, a_8\}$ and $\{b_1, b_2, b_3, b_4, b_5, b_6, b_7, b_8\}$, and then pads the groups with zeros to get the desired inverse MDCT (iMDCT) input length. N iMDCTs are performed to inverse transform MDCT coefficients in each group to time domain blocks. In this example, each block is 2*Sw ms wide, where Sw is the subframe width defined above. Next, this block is windowed using the same Fielder window used by the LFE encoding unit shown in FIG. 4. Each subframe $S_i$ (i is an integer between 1<=i<=N) is reconstructed by appropriately overlap adding the windowed data of previous iMDCT output and current iMDCT output. Finally, the output of (1003) is reconstructed by concatenating all the N subframes

Example System Architecture

Figure 11:
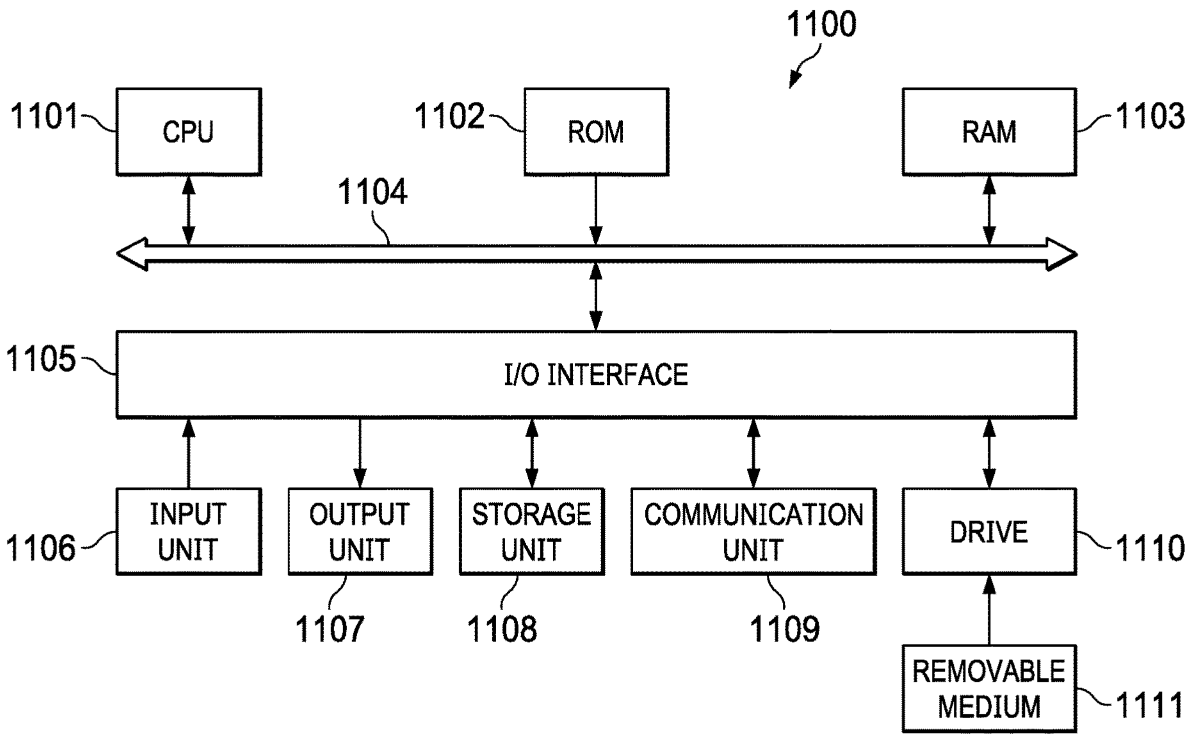
FIG. 11 is a block diagram of a system for implementing the features and processes described in reference to FIGS. 1-10, according to one or more implementations.

FIG. 11 is a block diagram of a system 1100 for implementing the features and processes described in reference to FIGS. 1-10, according to one or more implementations. System 1100 includes one or more server computers or any client device, including but not limited to: call servers, user equipment, conference room systems, home theatre systems, virtual reality (VR) gear and immersive content ingestion devices. System 1100 includes any consumer devices, including but not limited to: smart phones, tablet computers, wearable computers, vehicle computers, game consoles, surround systems, kiosks, etc.

As shown, system 1100 includes a central processing unit (CPU) 1101 which is capable of performing various processes in accordance with a program stored in, for example, a read-only memory (ROM) 1102 or a program loaded from, for example, a storage unit 1108 to a random-access memory (RAM) 1103. In the RAM 1103, the data required when the CPU 1101 performs the various processes is also stored, as required. The CPU 1101, the ROM 1102 and the RAM 1103 are connected to one another via a bus 1104. An input/output (I/O) interface 1105 is also connected to the bus 1104.

The following components are connected to the I/O interface 1105: an input unit 1106, that may include a keyboard, a mouse, or the like; an output unit 1107 that may include a display such as a liquid crystal display (LCD) and one or more speakers; the storage unit 1108 including a hard disk, or another suitable storage device; and a communication unit 1109 including a network interface card such as a network card (e.g., wired or wireless).

In some implementations, the input unit 1106 includes one or more microphones in different positions (depending on the host device) enabling capture of audio signals in various formats (e.g., mono, stereo, spatial, immersive, and other suitable formats).

In some implementations, the output unit 1107 include systems with various number of speakers. The output unit 1107 (depending on the capabilities of the host device) can render audio signals in various formats (e.g., mono, stereo, immersive, binaural, and other suitable formats).

The communication unit 1109 is configured to communicate with other devices (e.g., via a network). A drive 1110 is also connected to the I/O interface 1105, as required. A removable medium 1111, such as a magnetic disk, an optical disk, a magneto-optical disk, a flash drive or another suitable removable medium is mounted on the drive 1110, so that a computer program read therefrom is installed into the storage unit 1108, as required. A person skilled in the art would understand that although the system 1100 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 1309, and/or installed from the removable medium 1111.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 11), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine/computer readable medium may be any tangible medium that may contain or store a program for use by or in connection with an instruction execution system, apparatus, or device. The machine/computer readable medium may be a machine/computer readable signal medium or a machine/computer readable storage medium. A machine/computer readable medium may be non-transitory and may include but not limited to an electronic, magnetic, optical, electromagnetic, infrared, or semiconductor system, apparatus, or device, or any suitable combination of the foregoing. More specific examples of the machine/computer readable storage medium would include an electrical connection having one or more wires, a portable computer diskette, a hard disk, RAM, ROM, an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of encoding a low-frequency effect (LFE) channel, comprising:

receiving, using one or more processors, a time-domain LFE channel signal;

filtering, using a low-pass filter, the time-domain LFE channel signal to produce a filtered time-domain LFE channel signal, wherein the low-pass filter has a cut-off frequency;

converting, using the one or more processors, the filtered time-domain LFE channel signal into a frequency-domain representation of the time-domain LFE channel signal that includes a number of coefficients representing a frequency spectrum of the time-domain LFE channel signal;

arranging, using the one or more processors, the coefficients into two or more subband groups corresponding to different frequency bands of the time-domain LFE channel signal, wherein the different frequency bands include a primary LFE frequency band that is below a cut-off frequency of an LFE speaker and at least one other LFE frequency band that is higher than the cut-off frequency of the LFE speaker, where each subband group has a width, and a sum of the widths of the subband groups includes the primary LFE frequency band and the at least one other LFE frequency band;

quantizing, using the one or more processors, the coefficients in each subband group according to a frequency response curve of the low-pass filter to produce quantized coefficients;

encoding, using the one or more processors, the quantized coefficients in each subband group using an entropy coder tuned for the subband group; and generating, using the one or more processors, a bitstream including the encoded quantized coefficients; and storing, using the one or more processors, the bitstream on a storage device or streaming the bitstream to a downstream device.

2. A low-latency, low-frequency effect (LFE) decoder, comprising:

one or more processors; and a non-transitory computer-readable medium storing instructions that, upon execution by the one or more processors, cause the one or more processors to perform operations of method claim 1.

3. A non-transitory, computer-readable medium storing instructions that, upon execution by one or more processors, cause the one or more processors to perform operations of claim 1.

* * * * *